Jan. 5, 1926.
F. L. BLADE
1,568,204
TRACTOR HITCH
Filed Oct. 29, 1923
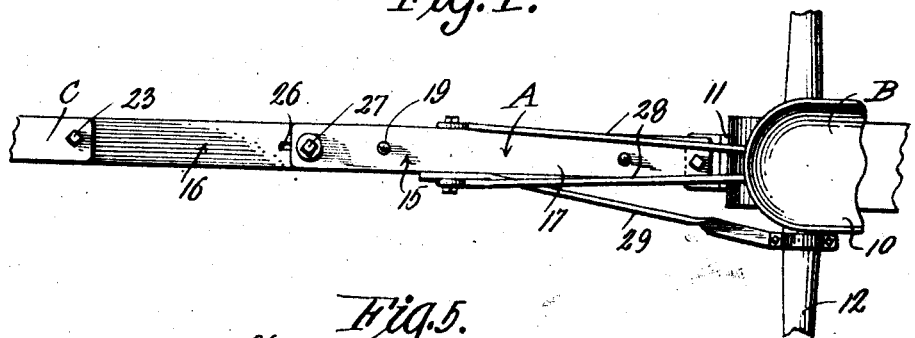
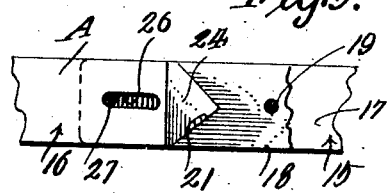
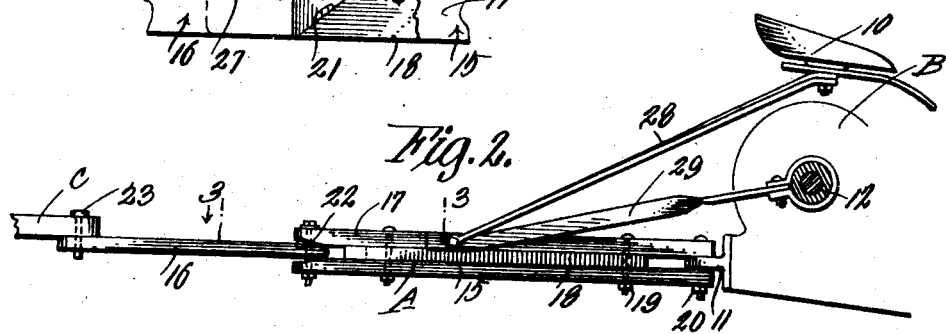
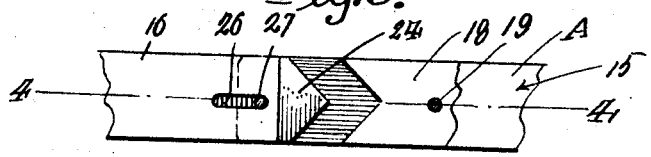
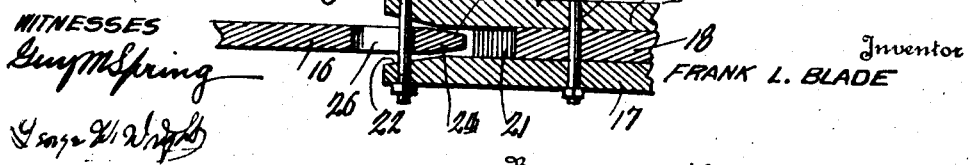
WITNESSES
Inventor
FRANK L. BLADE
By Richard B. Owen
Attorney Patented Jan. 5, 1926.

1,568,204

UNITED STATES PATENT OFFICE.

FRANK L. BLADE, OF SYCAMORE, ILLINOIS.

TRACTOR HITCH.

Application filed October 29, 1923. Serial No. 671,532.

*To all whom it may concern:*

Be it known that I, FRANK L. BLADE, a citizen of the United States, residing at Sycamore, in the county of De Kalb and State of Illinois, have invented certain new and useful Improvements in a Tractor Hitch, of which the following is a specification.

This invention appertains to novel means for connecting farming implements and the like to tractors and the primary object of the invention is to provide an improved hitch so constructed as to permit the effective drawing of farming implements by tractors, and to permit the backing up of the tractor and farming implement connected therewith, without the turning or twisting of the implement.

Another prime object of the invention is the provision of novel means for connecting the hitch to the tractor, so as to prevent side sway of the main draw bar of the hitch.

A still further object of the invention is to provide an improved tractor hitch of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed, and illustrated in the accompanying drawings, in which drawings:

Figure 1 is a plan view of the improved hitch showing the same connected to the rear end of the tractor and to the forward end of a tongue of a farming implement.

Figure 2 is a side elevation of the same.

Figure 3 is a detail horizontal section through the improved hitch taken on the line 3—3 of Figure 2.

Figure 4 is a fragmentary vertical longitudinal section through the improved hitch taken on the line 4—4 of Figure 3, and Figure 5 is a fragmentary horizontal section through the improved hitch showing the position of the draw bars of the tractor, when the tractor is being backed, so as to prevent relative movement between the said draw bars.

Referring to the drawings in detail, wherein similar reference characters designate corresponding parts throughout the several views, the letter A generally indicates the improved hitch, B a tractor with which the hitch can be connected and C the tongue of a farming implement.

The improved hitch A can be used with any preferred type of tractor and farming implement, and as shown the tractor B includes the driver's seat 10, the draw bar cap 11 and the rear axle housing 12.

The improved hitch A comprises a front draw bar 15, and a rear draw bar 16. The front draw bar 15 includes beams 17 held in spaced relation by a spacing beam 18. The beams 17 and 18 are connected together in any preferred way such as by bolts 19. The spacing beam 18 terminates short of the front and rear ends of the upper and lower beams 17 and this permits the front ends of the upper and lower beams 17 to receive the draw bar cap 11 as clearly shown in Figure 2 of the drawings. A pin 20 is utilized for connecting the front end of the hitch to the draw bar cap 11, as clearly shown in the drawings. The extreme rear end of the spacer beam 18 is provided with a V-shaped notch 21, for a purpose, which will be hereinafter more fully described. The rear terminals of the upper and lower beams 17 have their inner faces beveled as at 22 to form a guide surface, as also will be hereinafter more fully described.

The rear draw bar 16 is adapted to be pivotally connected to the tongue C of the desired farming implement by any preferred means, such as by a pin 23. The extreme forward end of the rear draw bar 16 is adapted to be received between the rear ends of the upper and lower beams 17 and the same is provided with a forwardly extending V-shaped tongue 24. The tongue can have its upper and lower faces beveled as at 25, so as to facilitate the insertion thereof between the upper and lower beams 17. This inserting movement is also facilitated by the beveled faces 22 of said upper and lower beams.

The rear draw bar 16 adjacent to the V-shaped tongue 24 is provided with a longitudinally extending slot 25, which permits longitudinal movement of the rear draw bar in relation to the front draw bar 15. A bolt 27 is carried by the extreme rear ends of the upper and lower beams 17 and this bolt extends through the slot 26 of the rear draw bar 16 as clearly shown in Figure 4 of the drawings. This connection permits swinging movement of the rear draw bar 16 as well as longitudinal movement thereof relative to the front bar 15.

The front draw bar 15 can be connected in any desired way to the tractor B by suitable brace bars according to the formation of the tractor and as shown downwardly and rearwardly inclined brace bars 28 are provided, which have their lower terminals connected to the draw bar 15 and their upper terminals connected to the seat 10. A diagonally extending brace bar 29 can also be provided and this brace bar 29 has its forward end connected to the axial housing 12 and its rear end to the draw bar 15. This brace bar 29 can be placed either on one side or the other of the draw bar 15 according to the draft of the farming implement connected to the hitch.

In use of the improved hitch, the same is connected to the tractor and to the farming implement as clearly shown in the drawings, and it is obvious that when the tractor is pulling the farming implement, that the rear draw bar 16 will slide backward in relation to the front bar 15 and this will permit free swinging movement of the draw bar 16. However, when it is desired to back the tractor and farming implement, it can be seen that the draw bar 16 will slide relative to the front draw bar 15 and that the V-shaped tongue 24 will rest in the V-shaped notch 21, which will then prevent twisting or turning movement of the rear draw bar 16 and permit the effective backing of the implement.

From the foregoing description, it can be seen that I have provided an exceptionally simple and durable hitch, which will effectively accomplish the purpose intended.

Changes in details may be made without departing from the spirit or the scope of this invention.

What I claim as new is:

A tractor hitch comprising a front draw bar including upper and lower beams, a spacer beam disposed between and connected to the upper and lower beams and having its terminals ending short of the front and rear ends of the upper and lower beams, the rear end of the spacer beam having a wide V-shaped notch formed therein, a rear draw bar having its forward terminal arranged between the rear terminals of the upper and lower beams of the front draw bar and having a longitudinally extending slot formed therein, a pivot bolt carried by the rear ends of the upper and lower beams of the front draw bar extended through said slot, and a V-shaped terminal formed on the front end of the rear draw bar for fitting in said notch when the rear draw bar is disposed in the front draw bar to its full extent, as and for the purpose specified.

In testimony whereof I affix my signature.

FRANK L. BLADE.